(12) United States Patent
Imamura et al.

(10) Patent No.: US 12,392,440 B2
(45) Date of Patent: Aug. 19, 2025

(54) WELDED BODY

(71) Applicant: DAIKIN INDUSTRIES, LTD., Osaka (JP)

(72) Inventors: Hitoshi Imamura, Osaka (JP); Eri Mukai, Osaka (JP); Hiroyuki Hamada, Osaka (JP); Yuuki Kuwajima, Osaka (JP); Manabu Fujisawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 312 days.

(21) Appl. No.: 17/701,246

(22) Filed: Mar. 22, 2022

(65) Prior Publication Data

US 2022/0213996 A1  Jul. 7, 2022

Related U.S. Application Data

(63) Continuation of application No. PCT/JP2020/029885, filed on Aug. 4, 2020.

(30) Foreign Application Priority Data

Sep. 24, 2019 (JP) .................................. 2019-172557

(51) Int. Cl.
*B29C 65/00* (2006.01)
*B29K 27/12* (2006.01)
(Continued)

(52) U.S. Cl.
CPC .......... *F16L 47/02* (2013.01); *B29C 66/1142* (2013.01); *B29C 66/5221* (2013.01);
(Continued)

(58) Field of Classification Search
CPC ......... B29L 2023/004; B29L 2023/005; B29L 2023/007; B29L 2023/22;
(Continued)

(56) References Cited

U.S. PATENT DOCUMENTS 4,022,256 A * 5/1977 Berkman ............ A61M 39/143
156/289
4,197,149 A    4/1980 Freitag et al.
(Continued)

FOREIGN PATENT DOCUMENTS

DE      19916786 A1 * 10/2000 ......... B29C 65/1635
EP      0415068 A2 *  7/1990
(Continued)

OTHER PUBLICATIONS

Extended European Search Report dated Jul. 24, 2023 in Application No. 20869961.1.
(Continued)

*Primary Examiner* — Michael C Romanowski

(74) *Attorney, Agent, or Firm* — Sughrue Mion, PLLC

(57) ABSTRACT

The present disclosure provides a welded body having a connecting structure formed by welding a first molded body and a second molded body, wherein the first and second molded bodies contain at least one copolymer selected from the group consisting of a tetrafluoroethylene/fluoro (alkyl vinyl ether) copolymer and a tetrafluoroethylene/hexafluoropropylene copolymer, and wherein the connecting structure has a liquid contact surface to be in contact with a liquid having a solubility parameter of 14 to 35 $(MPa)^{1/2}$, a welded part formed in the connecting structure is not exposed to the liquid contact surface, and the number of particles of 30 nm or larger to be eluted from the liquid contact surface in the connecting structure is 1,000 particles/ml or less.

3 Claims, 6 Drawing Sheets

(51) Int. Cl.
*B29L 23/00* (2006.01)
*C08F 214/26* (2006.01)
*C08L 27/18* (2006.01)
*F16L 47/02* (2006.01)
*B29K 27/18* (2006.01)

(52) U.S. Cl.
CPC .... *B29C 66/5229* (2013.01); *B29C 66/73921* (2013.01); *C08L 27/18* (2013.01); *B29K 2027/12* (2013.01); *B29K 2027/18* (2013.01); *B29L 2023/22* (2013.01); *C08F 214/262* (2013.01)

(58) Field of Classification Search
CPC ........ B29K 2027/12–18; A61M 39/10; A61M 39/14; A61M 39/143; A61M 39/146
See application file for complete search history.

(56) References Cited

U.S. PATENT DOCUMENTS

| | | | |
|---|---|---|---|
| 4,211,594 A | 7/1980 | Freitag et al. | |
| 4,801,349 A * | 1/1989 | Dommer | B29C 66/634 156/304.6 |
| 5,466,916 A * | 11/1995 | Iguchi | B29C 66/91443 285/21.2 |
| 2001/0042597 A1* | 11/2001 | Evans | B29C 66/91423 156/359 |
| 2005/0245709 A1 | 11/2005 | Chapman et al. | |
| 2005/0245725 A1 | 11/2005 | Chapman et al. | |
| 2007/0106027 A1* | 5/2007 | Namura | C08L 27/18 525/199 |
| 2008/0221301 A1* | 9/2008 | Chapman | C08F 6/001 528/401 |
| 2009/0087606 A1* | 4/2009 | Julien | B32B 27/304 428/36.6 |
| 2010/0133807 A1* | 6/2010 | Bilstad | B29C 66/0242 156/158 |
| 2015/0041145 A1* | 2/2015 | Colaianna | F16L 55/1652 138/140 |
| 2017/0253003 A1* | 9/2017 | Julien | B32B 1/08 |
| 2018/0283590 A1* | 10/2018 | Yokoyama | F16L 43/008 |
| 2019/0375929 A1* | 12/2019 | Nishimura | B29C 45/0025 |
| 2020/0139604 A1* | 5/2020 | Yabe | B29C 48/022 |
| 2021/0025522 A1* | 1/2021 | Andronaco | F16L 13/0227 |

FOREIGN PATENT DOCUMENTS

| | | | | |
|---|---|---|---|---|
| EP | 0 645 234 A1 | 3/1995 | | |
| EP | 2730829 A1 * | 5/2014 | ............ | B29C 65/02 |
| JP | 52-063274 A | 5/1977 | | |
| JP | 52-063275 A | 5/1977 | | |
| JP | 04357398 A * | 12/1992 | | |
| JP | H05104632 A * | 4/1993 | | |
| JP | 7-52253 A | 2/1995 | | |
| JP | 2004-189939 A | 7/2004 | | |
| JP | 2007-535609 A | 12/2007 | | |
| JP | 2007-535610 A | 12/2007 | | |
| JP | 2008-1022 A | 1/2008 | | |
| JP | 2012-233194 A | 11/2012 | | |
| TW | 200410874 A | 7/2004 | | |
| WO | 2013/129474 A1 | 9/2013 | | |

OTHER PUBLICATIONS

International Search Report for PCT/JP2020/029885 dated Oct. 20, 2020 [PCT/ISA/210].
International Preliminary Report on Patentability dated Mar. 15, 2022 with a Translation of the Written Opinion of the International Searching Authority in Application No. PCT/JP2020/029885.

* cited by examiner

WELDED BODY

CROSS-REFERENCE TO RELATED APPLICATIONS

This application is a Rule 53(b) Continuation of International Application No. PCT/JP2020/029885 filed Aug. 4, 2020, which claims priority based on Japanese Patent Application No. 2019-172557 filed Sep. 24, 2019, the respective disclosures of which are incorporated herein by reference in their entirety.

TECHNICAL FIELD

The present disclosure relates to a welded body.

BACKGROUND ART

Patent Literature 1 describes a melt-fabricable fluoropolymer containing an oligomer in an amount of at least about 25 ppm less than the amount in the fluoropolymer which is merely polymerized, the fluoropolymer containing neither an alkali nor an alkali earth metal.

CITATION LIST

Patent Literature

Patent Literature 1: Japanese Translation of PCT International Application Publication No. 2007-535609

SUMMARY

The present disclosure provides a welded body comprising a connecting structure formed by welding a first molded body and a second molded body, wherein the first and second molded bodies contain at least one copolymer selected from the group consisting of a tetrafluoroethylene/fluoro (alkyl vinyl ether) copolymer and a tetrafluoroethylene/hexafluoropropylene copolymer, and wherein the connecting structure has a liquid contact surface to be in contact with a liquid having a solubility parameter of 14 to 35 $(MPa)^{1/2}$, a welded part formed in the connecting structure is not exposed to the liquid contact surface, and the number of particles of 30 nm or larger to be eluted from the liquid contact surface in the connecting structure is 1,000 particles/ml or less.

EFFECTS

The present disclosure provides a welded body from which particles are unlikely to be generated.

DESCRIPTION OF EMBODIMENTS

Hereinafter, specific embodiments of the present disclosure will be described in detail, but the present disclosure is not limited to the following embodiments.

A welded body of the present disclosure has a connecting structure formed by welding a first molded body and a second molded body, wherein each of the first molded body and the second molded body contains at least one copolymer selected from the group consisting of a tetrafluoroethylene/fluoro (alkyl vinyl ether) copolymer (TFE/FAVE copolymer) and a tetrafluoroethylene/hexafluoropropylene copolymer (TFE/HFP copolymer). As an example of the welded body having such a connecting structure, a welded body which is formed by welding the first molded body and the second molded body by means of heating and melting a connecting part of a first molded body and a connecting part of a second molded body, and bringing the molten connecting parts in contact with each other is known.

Figure 1:
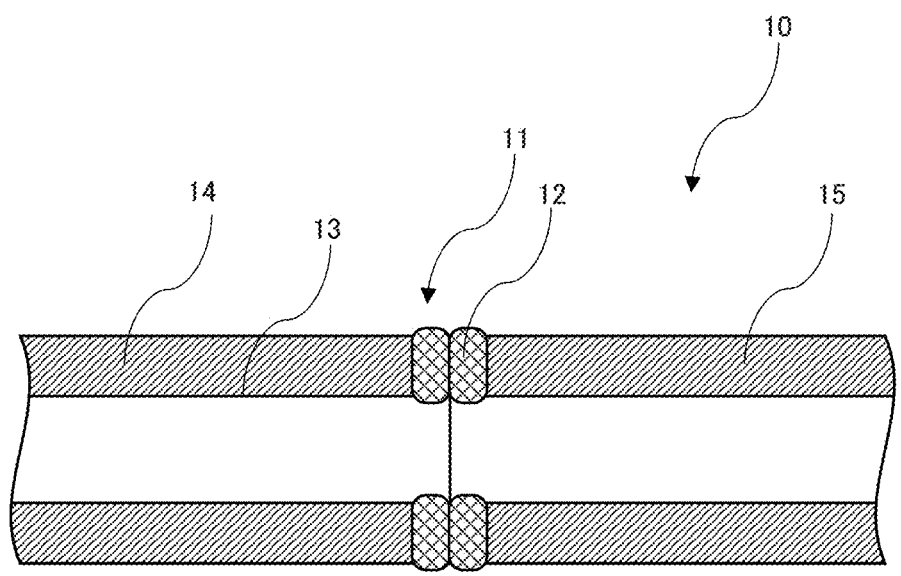
FIG. 1 is a schematic cross-sectional view of a welded tube having a connecting structure known in the art.

FIG. 1 is a schematic cross-sectional view of a welded tube having a connecting structure known in the art. The welded tube 10 shown in FIG. 1 can be prepared by welding the first tube 14 and the second tube 15 by means of heating and melting the connecting parts of a first tube 14 and a second tube 15, and bringing the molten connecting parts in contact with each other.

As shown in FIG. 1, in the welded tube 10 prepared in this manner, a connecting structure 11 is formed by welding the first tube 14 and the second tube 15, and the first tube 14 and the second tube 15 are integrated through the connecting structure 11, and thereby one welded tube 10 is formed. In the connecting structure 11, the first and second tubes are melted and then cooled and solidified, and thereby a welded part 12 is formed. The welded part 12 is partly exposed to an inner surface (liquid contact surface) 13 of the welded tube 10.

The present inventors have found that bringing the liquid contact surface to which at least a part of the welded part formed in the connecting structure of a welded body is exposed as described above into contact with a liquid having a particular solubility parameter unfortunately allows a large number of particles to be eluted into the liquid being in contact with the welded body.

Such knowledge of the present inventors is also based on different knowledge of the present inventors. According to the knowledge of the present inventors, even if the molded body is washed with ultrapure water until particles cannot be detected, particles are detected in isopropyl alcohol when isopropyl alcohol is brought into contact with the molded body after the washing. That is, the number of particles cannot be evaluated accurately by the known evaluation method carried out by washing the molded body using ultrapure water, collecting the ultrapure water (water used in washing), and measuring the number of particles dispersed in the ultrapure water, although the novel evaluation method using isopropyl alcohol has enabled accurate evaluation of the number of particles. Based on this knowledge, the present inventors have been able to evaluate the elution of particles from a welded part appropriately and find the knowledge mentioned above.

By the progress of micronization process of semiconductors, reduction of contaminants from a molded body used in a semiconductor apparatus or chemical liquid supplying facilities has been becoming important. For example, Japanese Patent Laid-Open No. 2014-222756 has pointed out that particles generated from piping for supplying a chemical liquid are unfortunately incorporated into the chemical liquid. Generation of particles from a welded body, particularly generation of particles from a connecting structure including a welded part, is not known, but according to newly found knowledge, development of a technique for suppressing the generation of particles from a connecting structure including a welded part is a pressing need.

The mechanism as to how the particles are eluted is not altogether clear, but an inferred mechanism is described with reference to FIG. 1. As mentioned above, the welded tube 10 shown in FIG. 1 can be prepared by melting respective connecting parts of the first and second tubes with a hot plate (heater) and welding the connecting parts. When the first and second tubes are melted, a low molecular weight substance is volatilized from the TEE/FAVE copolymer or the TFE/HFP copolymer being in a molten state. On the other hand, in the above-described welding method, the parts other than the connecting parts of the first and second tubes are not heated and remain to be at a low temperature even when the first and second tubes are melted. Therefore, the volatilized low molecular weight substance (polymer fumes) reaches the low-temperature parts and is cooled to adhere to the inner surface of the welded tube 10. Further, the low molecular weight substance generated when the TFE/FAVE copolymer or the TFE/HFP copolymer is melted remains also in the welded part 12 of the welded tube 10.

The low molecular weight substance generated from the TFE/FAVE copolymer or the TFE/HFP copolymer has a chemical structure similar to the chemical structures of these copolymers and adheres to the inner surface of the welded tube due to strong hydrophobic interaction, thus it is extremely difficult to wash away the low molecular weight substance with water. On the other hand, the low molecular weight substance generated from the TFE/FAVE copolymer or the TFE/HFP copolymer has high miscibility with a liquid having a solubility parameter of 14 to 35 $(MPa)^{1/2}$, and therefore a liquid having a solubility parameter of 14 to 35 $(MPa)^{1/2}$, when circulating, easily washes away the low molecular weight substance adhered to the inner surface of the welded tube 10, so that the low molecular weight substance is eluted into the liquid. Further, when the welded part 12 formed in the connecting structure 11 of the welded tube 10 is exposed to the liquid contact surface 13, the low molecular weight substance left in the welded part 12 is eluted into the liquid.

In contrast, in the welded body of the present disclosure, the welded part formed in the connecting structure is not exposed to the liquid contact surface, and therefore even when the liquid contact surface in the connecting structure comes into contact with a liquid having a solubility parameter of 14 to 35 $(MPa)^{1/2}$, the elution of particles into the liquid can be highly suppressed.

The connecting structure included in the welded body of the present disclosure will be described in more detail with reference to FIG. 2 to FIG. 5. Description will be made herein taking a welded tube as an example of the welded body.

Figure 2:
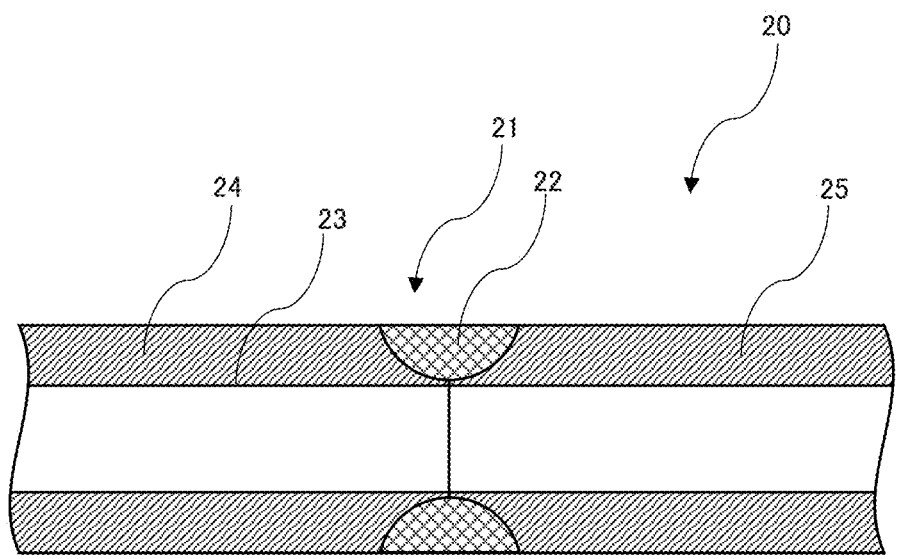
FIG. 2 is a schematic cross-sectional view showing one embodiment of a welded body of the present disclosure.

FIG. 2 is a schematic cross-sectional view showing one embodiment of the welded body of the present disclosure. In the welded tube 20 shown in FIG. 2, a first tube 24 and a second tube 25 are welded through a connecting structure 21, and in the connecting structure 21, respective connecting parts (not shown) of the first tube 24 and the second tube 25 are melted and then solidified, thereby a welded part 22 is formed.

When the first tube 24 and the second tube 25 are welded, the first tube 24 and the second tube 25 are welded by bringing the respective tube edges into contact with each other, and heating the connecting parts of each tube from the outer periphery of each tube such that the copolymer which lies near the inner surface of each tube is not melted. Thereby, in the connecting structure 21, the welded part 22 is formed such that the welded part 22 is not exposed to the inner surface (liquid contact surface) 23 of the welded tube 20. The welded part 22 formed in this manner is not exposed to the inner surface (liquid contact surface) 23 of the welded tube 20, and the elution of the low molecular weight substance from the welded part 22 can thereby be suppressed. Further, the low molecular weight substance which is volatilized from the TFE/FAVE copolymer or the TFE/HFP copolymer in a molten state is capable to be released outside the welded tube 20 when the first and second tubes are welded, and therefore the adhesion of the low molecular weight substance to the inner surface (liquid contact surface) 23 of the welded tube 20 can be suppressed.

Figure 3:
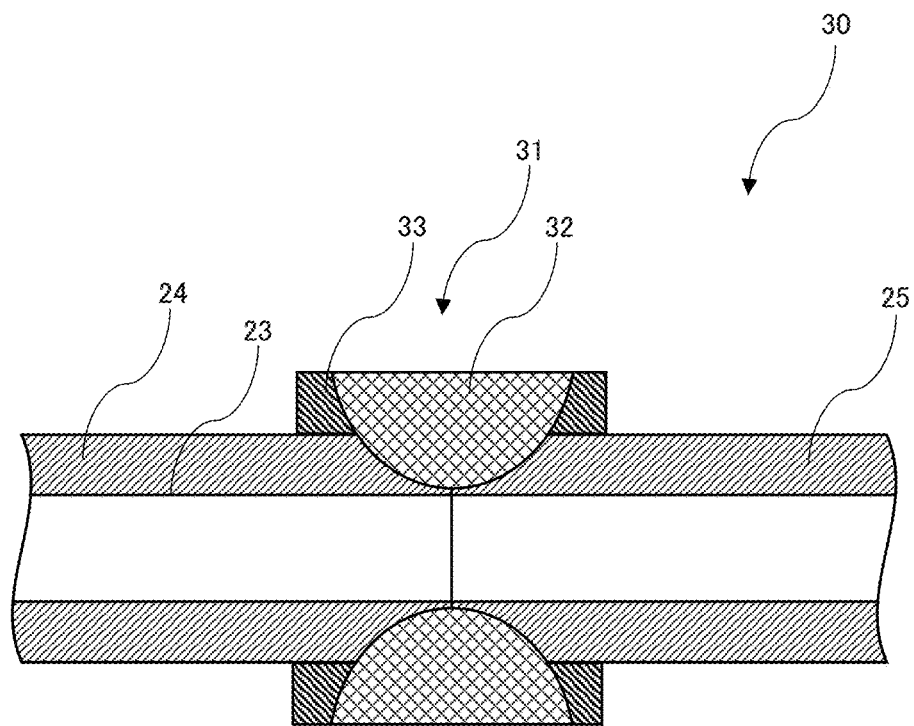
FIG. 3 is a schematic cross-sectional view showing one embodiment of a welded body of the present disclosure.

FIG. 3 is a schematic cross-sectional view showing another embodiment of the welded body of the present disclosure. In a welded tube 30 shown in FIG. 3, a resin tube 33 is provided at the outer periphery of respective connecting parts of the first tube 24 and the second tube 25 in a connecting structure 31. The resin tube 33 is preferably constituted of a copolymer being the same type as the copolymer which forms each tube. The resin tube 33 is melted together with the respective tubes when the first tube 24 and the second tube 25 are welded. Thereby, the respective tubes can be welded strongly, and this easily suppresses the exposure of a welded part 32 to the inner surface (liquid contact surface) 23 of the welded tube 30, which is caused by melting of the copolymer which lies near the inner surface of each tube due to excessive heating. The welded part 32 formed in this manner is formed throughout the respective connecting parts of the first tube 24, the second tube 25, and the resin tube 33, while not being exposed to the inner surface (liquid contact surface) 23 of the welded tube 30.

Figure 4:
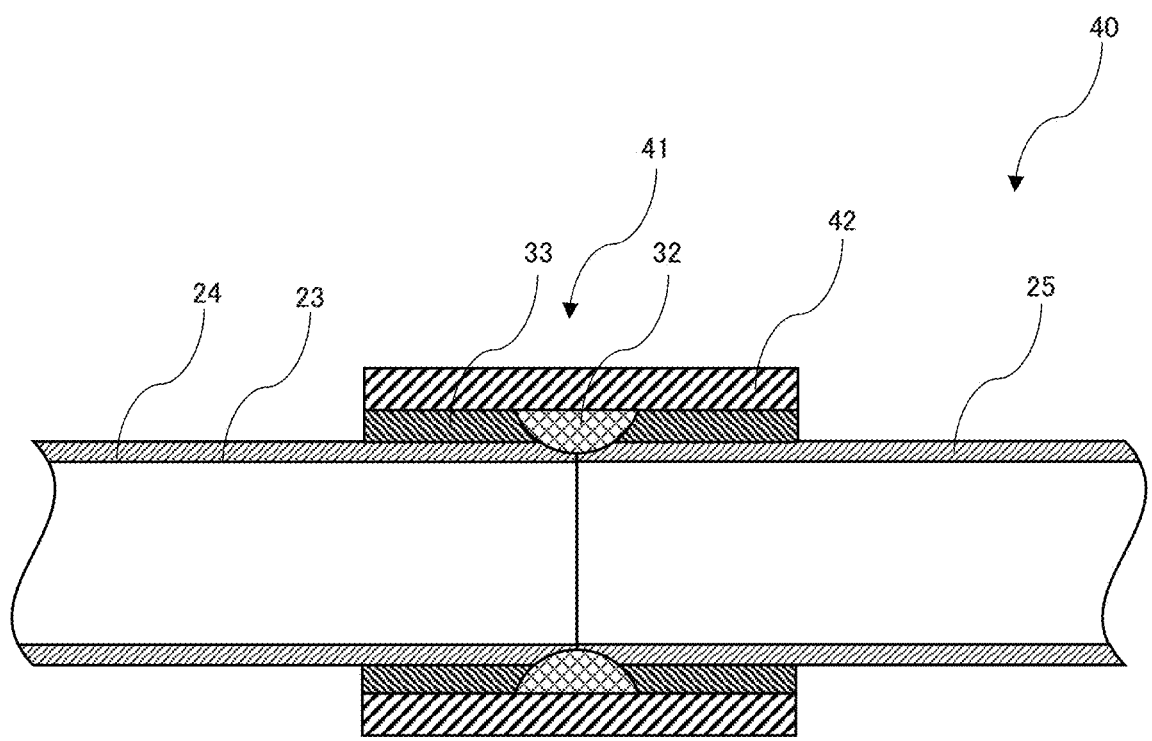
FIG. 4 is a schematic cross-sectional view showing one embodiment of a welded body of the present disclosure.

FIG. 4 is a schematic cross-sectional view showing another embodiment of the welded body of the present disclosure. In a welded tube 40 shown in FIG. 4, the resin tube 33 is provided at the outer periphery of respective connecting parts of the first tube 24 and the second tube 25 in a connecting structure 41, and further a heat-resistant tube 42 is provided at the outer periphery of the resin tube 33. The heat-resistant tube 42 is formed of a resin, such as, for example, polytetrafluoroethylene, having a melting point higher than the melting points of the TFE/FAVE copolymer and the TFE/HFP copolymer. By providing the heat-resistant tube 42, respective connecting parts of the first tube 24, the second tube 25, and the resin tube 33 can be heated from the outer periphery of the heat-resistant tube 42 and melted in a state where the heat-resistant tube 42 is not melted when the first tube 24 and the second tube 25 are welded. As a result, the respective tubes and the resin tube can be welded in a short time while deformation of the tube and melting of the copolymer which lies near the inner surface of each tube is suppressed, so that the welded tube 40 can be provided with high productivity.

The welded tube of each embodiment described above has a connecting structure formed by directly welding the first tube and the second tube, but the welded body of the present disclosure is not limited to these embodiments. For example, the welded body of the present disclosure may be a welded body formed by welding three or more molded bodies, or may be a welded body formed by welding, as molded bodies, molded bodies each having a shape other than the tube.

Figure 5:
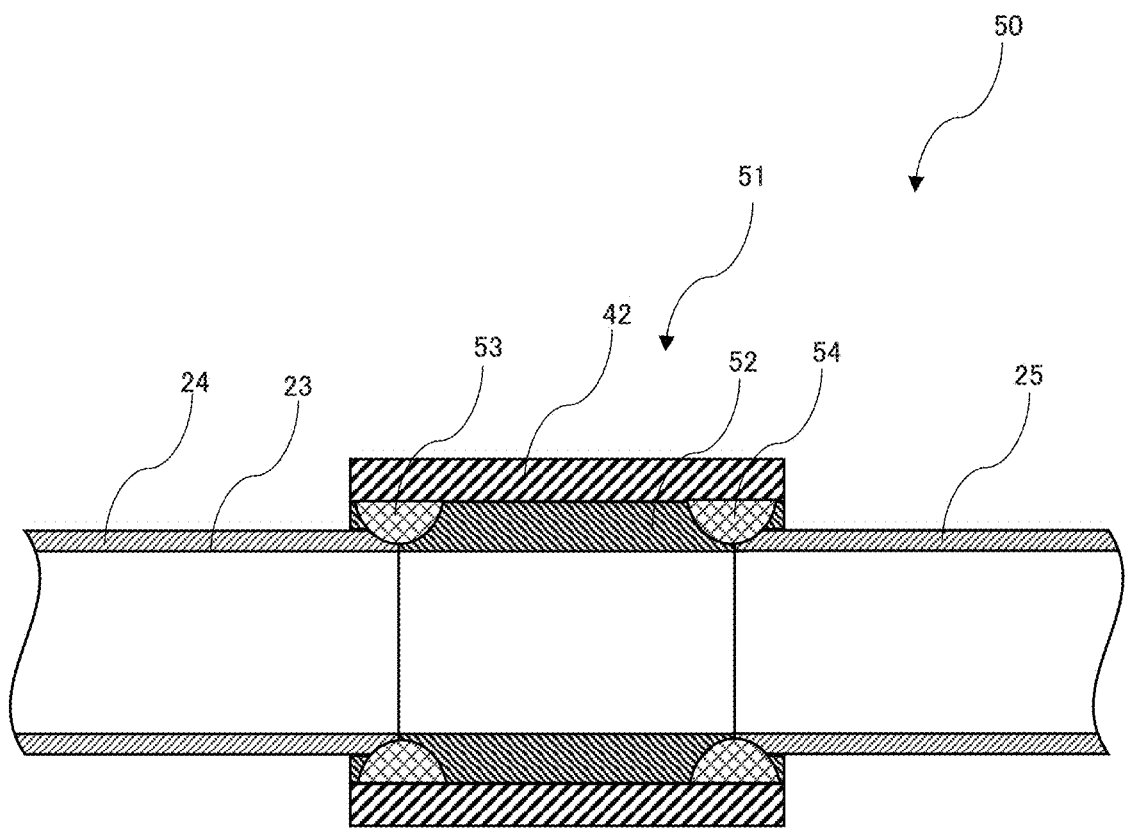
FIG. 5 is a schematic cross-sectional view showing one embodiment of a welded body of the present disclosure.

FIG. 5 is a schematic cross-sectional view showing another embodiment of the welded body of the present disclosure. In a welded tube 50 shown in FIG. 5, the first tube 24 and the second tube 25 are connected through a joint 52, and a connecting structure 51 is thereby formed. In the connecting structure 51, a welded part 53 is formed by welding the first tube 24 and the joint 52, and a welded part 54 is formed by welding the second tube 25 and the joint 52. The joint 52 is preferably constituted of a copolymer being the same type as the copolymer which forms each tube. When these are welded, respective connecting parts of the tube 24 and the second tube 25 in a connecting structure 41, and further a heat-resistant tube 42 is provided at the outer periphery of the resin tube 33. The heat-resistant tube 42 is formed of a resin, such as, for example, polytetrafluoroethylene, having a melting point higher than the melting points of the TFE/FAVE copolymer and the TFE/HFP copolymer. By providing the heat-resistant tube 42, respective connecting parts of the first tube 24, the second tube 25, and the resin tube 33 can be heated from the outer periphery of the heat-resistant tube 42 and melted in a state where the heat-resistant tube 42 is not melted when the first tube 24 and the second tube 25 are welded. As a result, the respective tubes and the resin tube can be welded in a short time while deformation of the tube and melting of the copolymer which lies near the inner surface of each tube is suppressed, so that the welded tube 40 can be provided with high productivity.

The welded tube of each embodiment described above has a connecting structure formed by directly welding the first tube and the second tube, but the welded body of the present disclosure is not limited to these embodiments. For example, the welded body of the present disclosure may be a welded body formed by welding three or more molded bodies, or may be a welded body formed by welding, as molded bodies, molded bodies each having a shape other than the tube.

FIG. 5 is a schematic cross-sectional view showing another embodiment of the welded body of the present disclosure. In a welded tube 50 shown in FIG. 5, the first tube 24 and the second tube 25 are connected through a joint 52, and a connecting structure 51 is thereby formed. In the connecting structure 51, a welded part 53 is formed by welding the first tube 24 and the joint 52, and a welded part 54 is formed by welding the second tube 25 and the joint 52. The joint 52 is preferably constituted of a copolymer being the same type as the copolymer which forms each tube. When these are welded, respective connecting parts of the first tube 24, the second tube 25, and the joint 52 are heated from the outer periphery of the heat-resistant tube 42 and melted. By forming the connecting structure such that the welded parts in the connecting structure are not exposed to the liquid contact surface 23 of the welded tube, particles are unlikely to be eluted from the welded body of the present disclosure when a plurality of welded parts is formed in the connecting structure or when a plurality of connecting structures is formed.

By connecting a plurality of tubes through a joint, as in the welded tube shown in FIG. 5, welded tubes having the connecting structures 51 having various shapes can be prepared. For example, by using a joint having a different diameter at each end, a welded tube in which two tubes each having a different diameter are connected can be prepared. Further, by using a three-way joint, a welded tube having a three-way connecting structure can be prepared. Furthermore, by using a joint having an elbow shape, an L-shaped welded tube can be prepared.

As described above, the elution of particles into a liquid can be highly suppressed by forming the connecting structure such that the welded part in the connecting structure is not exposed to the liquid contact surface of the welded tube, even when the liquid contact surface in the connecting structure comes into contact with a liquid having a solubility parameter of 14 to 35 $(MPa)^{1/2}$.

With respect to the connecting structure included in the welded body of the present disclosure, the number of particles of 30 nm or larger to be eluted from the liquid contact surface in the connecting structure is 1,000 particles/ml or less. The number of particles to be eluted is preferably 700 particles/ml or less, more preferably 600 particles/ml or less, and still more preferably 500 particles/ml or less, and the lower limit is not limited but is preferably 50 particles/ml or more. The number of particles eluted in the present disclosure refers to the number of particles dispersed in isopropyl alcohol, and the method of measuring the number of particles dispersed in isopropyl alcohol will be mentioned later.

The TFE/FAVE copolymer and the TFE/HFP copolymer usually have a solubility parameter of 12 to 13 $(MPa)^{1/2}$. Accordingly, the TFE/FAVE copolymer and the TFE/HFP copolymer have a solubility parameter that approximates to such an extent that the copolymers become wet sufficiently with a liquid having a solubility parameter of 14 to 35 $(MPa)^{1/2}$, and a low molecular weight substance generated from the TEE/FAVE copolymer or the TFE/HFP copolymer is easily eluted into a liquid having a solubility parameter of 14 to 35 $(MPa)^{1/2}$. On the other hand, the solubility parameter of water is about 47.9 $(MPa)^{1/2}$ and is significantly different from the solubility parameters of the TFE/FAVE copolymer and the TFE/HFP copolymer, and therefore the low molecular weight substance generated from the TFE/FAVE copolymer or the TFE/HFP copolymer exhibits water-repellency and is unlikely to become wet with water.

Examples of the liquid having a solubility parameter of 14 to 35 $(MPa)^{1/2}$ include organic chemical liquid which is used in semiconductor production processes, such as a solvent which is used as a coating material, the solvent described in Japanese Patent Laid-Open No. 63-69563, and a solvent which is used for a photoresist-removing thinner composition, the solvent described in Japanese Patent Laid-Open No. 2005-338825.

Examples of the liquid having a solubility parameter of 14 to 35 $(MPa)^{1/2}$ include: alcohols, such as isopropyl alcohol (23.5) (The numerical value in parentheses denotes a solubility parameter $((MPa)^{/2})$. The same applies hereinafter.), 1,3-dimethoxy-2-propanol (21.5), and 1-methoxy-3-ethoxy-2-propanol (22.3); aromatic compounds, such as xylene (18.0); ethers and ether acetates, such as methyl cellosolve (24.6), n-butyl acetate (20.5), cellosolve acetate (19.2), ethylene glycol monoethyl ether acetate (18.8), propylene glycol monomethyl ether acetate (20.9), propylene glycol monomethyl ether (16.2), propylene glycol monomethyl ether acetate (17.8), and 1,3-dimethoxy-2-butyl acetate (20.5); ketones, such as acetone (20.3), methyl ethyl ketone (19.2), methyl isobutyl ketone (19.0), and methyl propyl ketone (17.8); esters, such as methyl lactate, ethyl lactate (21.8), methyl acetate (19.6), ethyl acetate (18.4), butyl acetate (17.4), amyl acetate (17.0), methyl methoxypropionate (21.4), methyl 3-ethoxypropionate (21.4), ethyl 3-ethoxypropionate (21.0), and ethyl 4-ethoxybutyrate (20.9); glycerins, such as glycerol (33.8); alkanes, such as n-pentane (13.3) and cyclohexane (16.8); and mixtures thereof.

Among these, the liquid having a solubility parameter of 14 to 35 $(MPa)^{1/2}$ is preferably an alcohol and is more preferably isopropyl alcohol.

The welded body of the present disclosure is formed from the first and second molded bodies containing at least one copolymer selected from the group consisting of a tetrafluoroethylene (TFE)/fluoro (alkyl vinyl ether) (FAVE) copolymer (TFE/FAVE copolymer) and a tetrafluoroethylene (TFE)/hexafluoropropylene (HFP) copolymer (TFE/HFP copolymer). Accordingly, the welded body of the present disclosure contains at least one copolymer selected from the group consisting of a TEE/FAVE copolymer and a TFE/HFP copolymer.

The copolymer contained in the welded body of the present disclosure is a melt-fabricable fluororesin. "Melt-fabricable" means that the polymer can be melted and processed using a processing apparatus known in the art, such as an extruder and an injection molding machine.

From the viewpoint of the moldability of the copolymer and the mechanical properties of the welded body and from the viewpoint that a low molecular weight substance which is volatilized by heating and a low molecular weight substance which causes particles to be generated due to pyrolysis can be suppressed by controlling the melt flow rate in an appropriate range, the melt flow rate of the copolymer is preferably 1 to 60 g/10 min, more preferably 50 g/10 min or less, still more preferably 40 g/10 min or less, particularly preferably 30 g/10 min or less, for example, 13 g/10 min or less.

In the present disclosure, the melt flow rate refers to a value obtained in accordance with ASTM D1238 using a melt indexer (manufactured by YASUDA SEIKI SEI-SAKUSHO, LTD.) as the mass (g/10 min) of a polymer which flows out per 10 minutes from a nozzle having an inner diameter of 2.1 mm and a length of 8 mm at 372° C. under a load of 5 kg.

From the viewpoint of the heat resistance and mechanical properties of the welded body, the melting point of the copolymer is preferably 200 to 322° C., more preferably 210° C. or higher, and still more preferably 220° C. or higher, and is more preferably 315° C. or lower, and still more preferably 310° C. or lower. The melting point may be measured using a differential scanning calorimeter [DSC].

The copolymer is more preferably the TFE/FAVE copolymer. The TFE/FAVE copolymer contains a TFE unit and a FAVE unit.

From the viewpoint of the mechanical properties of the welded body, the content of the FAVE unit in the TFE/FAVE copolymer is preferably 3.3 to 12.0% by mass, more preferably 4.0% by mass or more, and still more preferably 5.0% by mass or more, and is more preferably 7.0% by mass or less, still more preferably 6.5% by mass or less, and further still more preferably 6.0% by mass or less, based on the total amount of the monomer units.

From the viewpoint of the mechanical properties of the welded body, the content of the TFE unit in the TFE/FAVE copolymer is preferably 96.7 to 88.0% by mass, more preferably 96.0% by mass or less, and still more preferably 95.0% by mass or less, and is more preferably 93.0% or more, still more preferably 93.5% or more, and further still more preferably 94.0% by mass or more, based on the total amount of the monomer units.

In the present disclosure, the content of each monomer unit in the copolymer can be measured by a 19F-NMR method.

Examples of FAVE constituting the FAVE unit include at least one selected from the group consisting of a monomer represented by formula (1):

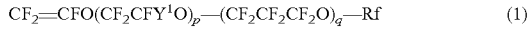

$$CF_2=CFO(CF_2CFY^1O)_p-(CF_2CF_2CF_2O)_q-Rf \quad (1)$$

wherein $Y^1$ represents F or $CF_3$, Rf represents a C1-C5 perfluoroalkyl group, p represents an integer of 0 to 5, and q represents an integer of 0 to 5, and a monomer represented by formula (2):

$$CFX=CXOCF_2OR^1 \quad (2)$$

wherein Xs are the same or different and represent H, F, or $CF_3$, and $R^1$ represents a linear or branched C1-C6 fluoroalkyl group optionally containing one or two atoms of at least one of an atom selected from the group consisting of H, Cl, Br, and I, or a C5 or C6 cyclic fluoroalkyl group optionally containing one or two atoms of at least one of an atom selected from the group consisting of H, Cl, Br, and I.

Among others, from the viewpoint of the mechanical properties of the welded body, FAVE is preferably the monomer represented by formula (1), more preferably at least one selected from the group consisting of perfluoro (methyl vinyl ether), perfluoro (ethyl vinyl ether) (PEVE), and perfluoro (propyl vinyl ether) (PPVE), still more preferably at least one selected from the group consisting of PEVE and PPVE, and particularly preferably PPVE.

In some embodiments, the TFE/FAVE copolymer contains a monomer unit derived from a monomer copolymerizable with TFE and FAVE from the viewpoint of the mechanical properties of the welded body. The content of the monomer copolymerizable with TFE and FAVE is preferably 0 to 40% by mass, more preferably 0.01 to 10% by mass, and still more preferably 0.1 to 3.5% by mass, based on the total amount of the monomer units of the copolymer.

Examples of the monomer copolymerizable with TFE and FAVE include HFP, a vinyl monomer represented by $CZ^1Z^2=CZ^3(CF_2)_nZ^4$ wherein $Z^1$, $Z^2$, and $Z^3$ are the same or different and represent H or F, $Z^4$ represents H, F, or Cl, and n represents an integer of 2 to 10, and an alkyl perfluorovinyl ether derivative represented by $CF_2=CF-OCH_2-Rf^1$ wherein $Rf^1$ represents a C1-C5 perfluoroalkyl group. Among others, HFP is preferable.

From the viewpoint of the heat resistance and mechanical properties of the welded body, the melting point of the TFE/FAVE copolymer is preferably 280 to 322° C., more preferably 285° C. or higher, still more preferably 295° C. or higher, and particularly preferably 300° C. or higher, and is more preferably 315° C. or lower, and still more preferably 310° C. or lower.

The glass transition temperature (Tg) of the TFE/FAVE copolymer is preferably 70 to 110° C., and more preferably 80° C. or higher, and is more preferably 100° C. or lower. The glass transition temperature may be measured by dynamic viscoelasticity measurement.

Examples of the copolymer also include the TFE/HFP copolymer. The TFE/HFP copolymer contains a TFE unit and a HFP unit.

From the viewpoint of the mechanical properties of the welded body, the content of the HFP unit in the TFE/HFP copolymer is preferably 0.2% by mass or more, more preferably 1.0% by mass or more, and still more preferably 2.0% by mass or more, and is preferably 30% by mass or less, and more preferably 15% by mass or less, based on the total amount of the monomer units.

From the viewpoint of the mechanical properties of the welded body, the content of the THE unit in the TFE/HFP copolymer is preferably 70% by mass or more, and more preferably 85% by mass or more, and is preferably 99.8% by mass or less, more preferably 99.0% by mass or less, and still more preferably 98.0% by mass or less, based on the total amount of the monomer units.

From the viewpoint of the heat resistance and mechanical properties of the welded body, the melting point of the TFE/HFP copolymer is preferably 200 to 322° C., more preferably 210° C. or higher, and still more preferably 220° C. or higher, and is more preferably lower than 300° C., and still more preferably 280° C. or lower.

The glass transition temperature (Tg) of the TFE/HFP copolymer is preferably 60 to 110° C., and more preferably 65° C. or higher, and is more preferably 100° C. or lower.

particular functional group, which appears in this difference spectrum, according to the following formula (A).

$$N = I \times K/t \tag{A}$$

I: Absorbance
K: Correction coefficient
t: Thickness (mm) of film

For reference, Table 1 shows the absorption frequency, molar absorption coefficient, and correction coefficient for the functional groups in the present disclosure. In addition, the molar absorption coefficient is determined from FT-IR measurement data for a low molecular weight model compound.

[Table 1]

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

From the viewpoint of the heat resistance and mechanical properties of the welded body, the copolymer is preferably at least one selected from the group consisting of a copolymer consisting only of a TFE unit and a FAVE unit and a TFE/FAVE/HFP copolymer, and more preferably a copolymer consisting only of a TFE unit and a FAVE unit.

The copolymer contained in the welded body of the present disclosure is preferably a copolymer having less functional groups because the welded body from which the number of particles to be eluted is further reduced can be produced. The number of functional groups of the copolymer is preferably 50 or less, more preferably 30 or less, and still more preferably 15 or less, per $10^6$ carbon atoms. In some embodiments, the lower limit of the number of functional groups of the copolymer is 0.

The functional group refers to a functional group which is present at a terminal of the main chain or a terminal of the side chain of the copolymer, and a functional group which is present in the main chain or the side chain. The functional group is preferably at least one selected from the group consisting of —CF=CF$_2$, —CF$_2$H, —COF, —COOH, —COOCH$_3$, —CONH$_2$, and —CH$_2$OH.

An infrared spectroscopic analysis method may be used for the identification of the type of the functional group and the measurement of the number of functional groups.

Specifically, the number of functional groups is measured by the following method. Firstly, the copolymer is melted at 330 to 340° C. for 30 minutes and compression-molded to prepare a film having a thickness of 0.20 to 0.25 mm. This film is analyzed by Fourier transform infrared spectroscopy to obtain an infrared absorption spectrum, and a difference spectrum against a base spectrum that is completely fluorinated and has no functional group is obtained. The number N of functional groups per 1×10$^6$ carbon atoms in the copolymer is calculated from the absorption peak of a The absorption frequencies of —CH$_2$CF$_2$H, —CH$_2$COF, —CH$_2$COOH, —CH$_2$COOCH$_3$, —CH$_2$CONH$_2$ are lower than the absorption frequencies of —CF$_2$H, —COF, —COOH free and —COOH bonded, —COOCH$_3$, and —CONH$_2$, shown in the table, by several tens of kayser ($cm^{-1}$), respectively.

For example, the number of functional groups for -COF refers to the total of the number of functional groups determined from the absorption peak at an absorption frequency of 1883 $cm^{-1}$ attributable to —CF$_2$COF and the number of functional groups determined from the absorption peak at an absorption frequency of 1840 $cm^{-1}$ attributable to —CH$_2$COF.

In some embodiments, the number of functional groups is the total number of —CF=CF$_2$, —CF$_2$H, —COF, —COOH, —COOCH$_3$, —CONH$_2$, and —CH$_2$OH.

The functional groups are introduced in the copolymer by, for example, a chain transfer agent or a polymerization initiator used when the copolymer is produced. For example, when an alcohol is used as the chain transfer agent, or a peroxide having a structure of —CH$_2$OH is used as the polymerization initiator, —CH$_2$OH is introduced at a terminal of the main chain of the copolymer. By polymerizing a monomer having the functional group, the functional group is introduced at a terminal of a side chain of the copolymer.

By subjecting the copolymer having such a functional group to fluorination treatment, the copolymer having the number of functional groups in the above-described range may be obtained. That is, the copolymer which is used in the production method of the present disclosure is preferably a fluorination-treated copolymer, and more preferably a completely fluorinated copolymer. Also, the copolymer preferably has a —CF$_3$ terminal group.

The fluorination treatment can be performed by bringing the copolymer not having been subjected to fluorination treatment into contact with a fluorine-containing compound.

Examples of the fluorine-containing compound include, but not limited to, fluorine radical sources that generate a fluorine radical under a fluorination treatment condition. Examples of the fluorine radical source include a $F_2$ gas, $CoF_3$, $AgF_2$, $UF_6$, $OF_2$, $N_2F_2$, $CF_3OF$, and halogen fluorides (for example, $IF_5$ and $ClF_3$).

In some embodiments, the fluorine radical source, such as the $F_2$ gas, is the one having a concentration of 100%, but is preferably used after being diluted to 5 to 50% by mass by being mixed with an inert gas and is more preferably used after being diluted to 15 to 30% by mass in terms of safety. Examples of the inert gas include a nitrogen gas, a helium gas, and an argon gas, but a nitrogen gas is preferable from an economical aspect.

The condition of the fluorination treatment is not particularly limited, and in some embodiments, the copolymer in a molten state may be brought into contact with a fluorine-containing compound, but usually the fluorination treatment may be performed at a temperature equal to or lower than the melting point of the copolymer, preferably at a temperature of 20 to 220° C., and more preferably at a temperature of 100 to 200° C. The fluorination treatment is performed generally for 1 to 30 hours, and preferably for 5 to 25 hours. The fluorination treatment is preferably performed by bringing the copolymer which has not been subjected to fluorination treatment into contact with a fluorine gas ($F_2$ gas).

Examples of the welded body include, but not limited to, a welded body formed by welding a first molded body and a second molded body, wherein each of the first molded body and the second molded body is at least one selected from the group consisting of a pellet, a film, a sheet, a plate, a rod, a block, a cylinder, a container, an electric wire, a tube, a bottle, a joint, a bag, a wafer carrier, and the like. Suitable examples of the welded body include a welded body in which each of the first molded body and the second molded body is a tube, or a welded body in which the first molded body is a tube, and the second molded body is a joint.

The welded body is preferably a piping member, such as a welded tube, a joint, a bent tube, or a tube-welding member, and more preferably a welded tube. In the welded tube, a liquid contact surface can form the inner surface of the welded tube.

The shapes of the welded tube and the joint are not limited, and in some embodiments, the welded tube and the joint are U-shaped, H-shaped, L-shaped, or T-shaped.

The outer diameter of the welded tube is not limited and is, in some embodiments, 2 to 100 mm, 5 to 50 mm, or 5 to 20 mm. In some embodiments, the thickness of the welded tube is 0.1 to 10 mm or 0.3 to 5 mm.

When the shape of the tube is larger, the heating time required for welding is longer and therefore the number of particles to be eluted due to a volatilized low molecular weight substance tends to be larger. In such a case, the effect of the present disclosure is more remarkable.

Examples of the welded body also include the following:
a diaphragm part of a diaphragm pump, a bellows molded article, a covered wire product, a component for a semiconductor, packings/seals, a thin tube for a copy roll, a monofilament, a belt, a gasket, an optical lens component, a tube for oil drilling, a tube for geothermal power generation, an electric wire for oil drilling, an electric wire for a satellite, an electric wire for nuclear power generation, an electric wire for an airplane, a solar cell panel film, a gasket for a secondary battery, an electric double layer capacitor, or the like, an OA roll, and the like;

a tube for circulating a gas or a chemical liquid, a bottle for storing a chemical, a gas bag, a chemical liquid bag, a chemical liquid container, a bag for cryopreservation, and the like;

a body or components for an opening/closing valve, sleeves used when a joint and a tube is connected, screw caps for chemical liquid bottles or containers, gears, screws, products in which a base, such as a metal, is coated with a fluororesin, such as a frying pan, pots and pans, and a rice cooker, a release film, and the like.

Particularly suitable applications of the welded body of the present disclosure are fluororesin members for a semiconductor production apparatus, such as a piping of chemical liquid suppling facilities for semiconductor production, a tube, a joint, a valve, a tank, a container, a chemical liquid bag, a pump, and a filter.

Particularly, the welded tube of the present disclosure can suitably be used as a tube for chemical liquid piping which is for circulating a chemical liquid because particles hardly adhere to the inner surface and the welded tube of the present disclosure is unlikely to generate particles. The chemical liquid is not limited as long as it is a chemical liquid having a solubility parameter of 14 to 35 $(MPa)^{1/2}$, examples of the chemical liquid include a chemical liquid which is used for semiconductor production, and examples thereof include chemical liquid such as ammonia water, ozone water, a hydrogen peroxide solution, a hydrogen fluoride solution, hydrochloric acid, sulfuric acid, a resist solution, a thinner solution, and a developer.

The welded body of the present disclosure can be used as, for example, a member which is installed in an apparatus for carrying out pre-processing for a semiconductor. Examples of the pre-processing for a semiconductor include the following steps.

a. "Cleaning" of cleaning a silicon wafer to be a base
b. "Film formation" of forming a thin film to be a circuit material on a silicon wafer
c. "Resist application" of applying a photoresist (photosensitive solution) uniformly
d. "Exposure" of transferring a circuit pattern
e. "Development" of dissolving a photoresist at an exposed part
f. "Etching" of removing a thin film as a base coat, the thin film exposed by a chemical liquid or an ion
g. "Ion implantation" of implanting an impurity, such as phosphorus, to allow silicon to have electric properties
h. "Release" of removing unnecessary photoresist The chemical liquid which is used in these steps include wide variety of types, such as acids, alkalis, and organic solvents. The chemical liquid to be used is transported to a use point from a tank by chemical liquid supplying facilities while coming into contact with the inner front sides of piping, tubes, joints, valves, pumps, filters, and the like. On this occasion, the chemical liquid supplying facilities are generally washed in advance with ultrapure water or the chemical liquid to be used. A semiconductor production apparatus and a resist applying apparatus called as a coater developer are washed for cleaning after assembling the apparatuses. However, washing process of the above-mentioned apparatus may require use of a large amount of an expensive chemical liquid and a long time for washing. This is also a heavy economic burden.

Since particles are unlikely to be generated from the welded body of the present disclosure, the welded body of the present disclosure can particularly suitably be used as a member for carrying out the pre-processing for a semiconductor without washing using a large amount of an expensive chemical liquid for long hours. The welded tube can also be used for a tube-shaped part in products such as filters, valves, and pumps.

The embodiments have been described above, and it will be understood that various modifications in the embodiments and details may be made without deviating from the subject matter and scope of the claims.

The present disclosure provides a welded body comprising a connecting structure formed by welding a first molded body and a second molded body, wherein the first and second molded bodies contain at least one copolymer selected from the group consisting of a tetrafluoroethylene/fluoro (alkyl vinyl ether) copolymer and a tetrafluoroethylene/hexafluoropropylene copolymer, and wherein the connecting structure has a liquid contact surface to be in contact with a liquid having a solubility parameter of 14 to 35 $(MPa)^{1/2}$, a welded part formed in the connecting structure is not exposed to the liquid contact surface, and the number of particles of 30 nm or larger to be eluted from the liquid contact surface in the connecting structure is 1,000 particles/ml or less.

In the welded body of the present disclosure, the copolymer preferably has a melt flow rate of 1 to 60 g/10 min.

In the welded body of the present disclosure, the copolymer is preferably the tetrafluoroethylene/fluoro (alkyl vinyl ether) copolymer.

In the welded body of the present disclosure, a content of a fluoro (alkyl vinyl ether) unit in the tetrafluoroethylene/fluoro (alky vinyl ether) copolymer is preferably 3.3 to 12.0% by mass based on a total amount of monomer units.

In the welded body of the present disclosure, the number of functional groups of the copolymer is preferably 50 or less per $10^6$ carbon atoms.

In the welded body of the present disclosure, each of the first and second molded bodies is preferably a tube.

In the welded body of the present disclosure, the first molded body is preferably a tube, and the second molded body is preferably a joint.

The welded body of the present disclosure is preferably a welded tube, and the liquid contact surface preferably forms an inner surface of the welded tube.

Each of numerical values in Examples was measured by the following methods.

(Melting Point of Copolymers)

The melting point of each copolymer was determined as a temperature corresponding to a maximum value in a heat-of-fusion curve obtained when the temperature was increased at a rate of 10° C./min using a differential scanning calorimeter [DSC].

(MER of Copolymers)

The mass (g/10 min) of each polymer which flowed out per 10 minutes from a nozzle having an inner diameter of 2.1 mm and a length of 8 mm was determined in accordance with ASTM D1238 using a melt indexer (manufactured by YASUDA SEIKI SEISAKUSHO, LTD.) at 372° C. under a load of 5 kg.

(Contents of Monomer Units in Copolymers)

The contents of the monomer units in each copolymer were measured by a $^{19}$F-NMR method.

(Number of Functional Groups of Copolymers)

Each copolymer was melted and compression-molded at 330 to 340° C. for 30 minutes to prepare a film having a thickness of 0.20 to 0.25 mm. This film was scanned 40 times and analyzed with a Fourier transform infrared spectroscopic analyzer [FT-IR (trade name: 1760X, manufactured by PerkinElmer Inc.)] to obtain an infrared absorption spectrum, and a difference spectrum against a base spectrum that is completely fluorinated and has no functional group was obtained. The number N of functional groups per $1\times10^6$ carbon atoms in the sample is calculated from the absorption peak of a particular functional group, which appears in this difference spectrum, according to the following formula (A).

$$N = I \times K/t \qquad (A)$$

I: Absorbance
K: Correction coefficient
t: Thickness (mm) of film

For reference, Table 2 shows the absorption frequency, molar absorption coefficient, and correction coefficient for the functional groups in the present disclosure. In addition, the molar absorption coefficient is determined from FT-IR measurement data for a low molecular weight model compound.

[Table 2]

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

EXAMPLES

Hereinafter, the embodiments of the present disclosure will be described with reference to Examples, but is not limited only to these Examples.

(Number of Particles Eluted)

(1) Preparation of Isopropyl Alcohol

Commercially available high-purity isopropyl alcohol (IPA) was filtered using a 5 nmϕ filter. Filtered IPA was left to stand for one day to confirm that the number of particles having a size of 30 nmϕ or larger was 30 particles/ml or less. IPA (solubility parameter 23.5 $(MPa)^{1/2}$) thus filtered was used for cleaning each tube and measurement of the number of particles.

(2) Cleaning Welded Tube

The inner surface of each of the welded tubes prepared in Examples and Comparative Examples was washed using ultrapure water in an amount 5 times the inner volume of the welded tube to remove contaminating particles derived from the environment. Subsequently, immediately after filtered IPA was supplied into the welded tube to seal high-purity IPA in an amount equal to the inner volume of the welded body, the filtered IPA was discharged to replace ultrapure water with IPA.

(3) Measurement of Number of Particles

The welded tube obtained in (2) above was filled with high-purity IPA in an amount equal to the inner volume of the welded tube and left to stand for one day at room temperature.

Subsequently, IPA sealed in the welded tube was introduced into a particle counter (Light-scattering method Liquid-Borne Particle Sensor KS-19F, manufactured by RION Co., Ltd.) using a syringe pump to measure the number of particles.

Immediately after IPA was introduced into the particle counter, the maximum number of particles was measured, and thereafter the measured number of particles showed a tendency to decrease gradually. The maximum value of the total number of particles having a size of 30 nmϕ or larger after starting the measurement was used as the number of particles eluted from the welded body to make comparison.

Figure 6:
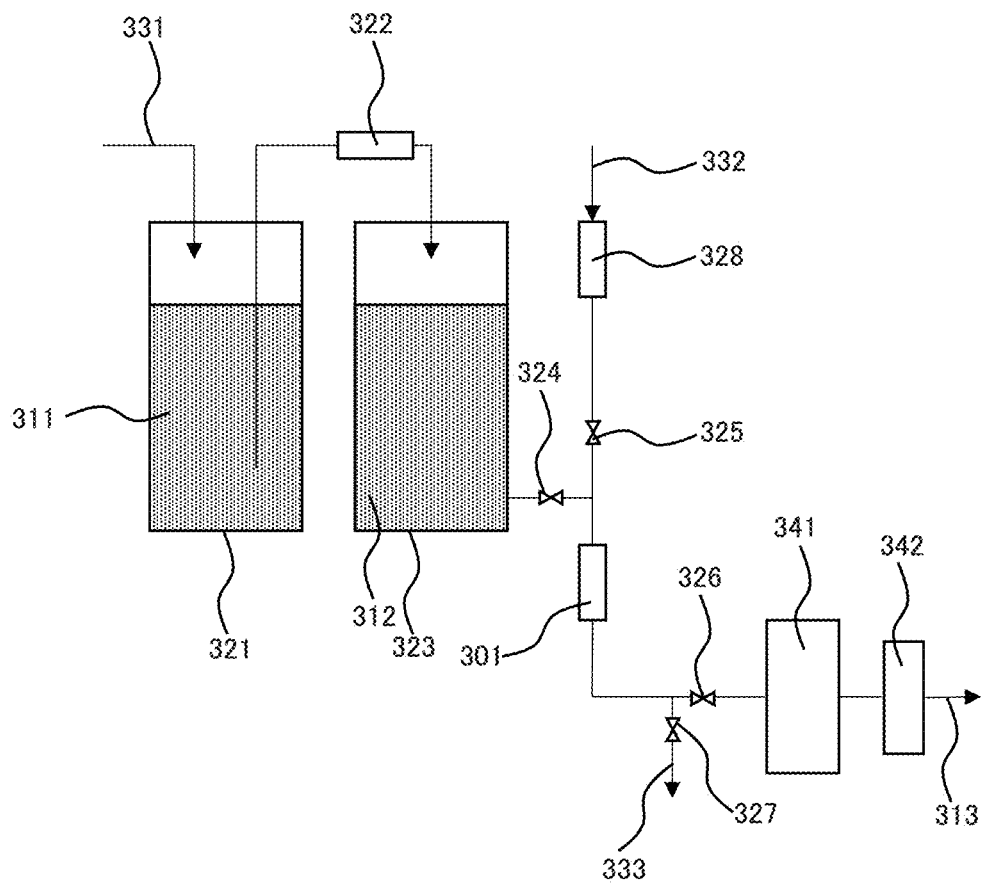
FIG. 6 is a diagram for describing a method of measuring the number of particles.

FIG. 6 is a diagram for describing the method of measuring the number of particles.

Firstly, a nitrogen gas 331 is supplied into a first chemical liquid container 321 to pressurize isopropyl alcohol (IPA) 311 retained in the chemical liquid container 321. Pressurized IPA 311 passes through a filter 322 and is retained in a second chemical liquid container 323. IPA 312 in the second chemical liquid container 323 is left to stand for one day and then used for the measurement.

A valve 324 is connected to a lower part of the second chemical liquid container 323, and a welded tube 301 is connected to the second chemical liquid container 323 through the valve 324. The other end of the welded tube 301 is connected to a particle counter 341 through a valve 326. A syringe pump 342 is provided on the downstream side of the particle counter 341 such that IPA in the welded tube 301 can be introduced into the particle counter 341. There is a need to avoid incorporation of particles from the connecting part between the welded tube 301 and the line. In the present Examples, a bore through connector manufactured by Flowell Corporation was used for attaching the welded tube 301.

Another line for supplying ultrapure water 332 into the welded tube 301 is provided, and the welded tube 301 is also connected to this line through a filter 328 and a valve 325.

There is a need to use diaphragm valves as the valves 324 to 326 in order to avoid incorporation of particles into IPA 312 and ultrapure water 332 caused by opening and closing the valves 324 to 326 connected to the welded tube 301. In the present Example, a polytetrafluoroethylene diaphragm valve was used.

After a system for measuring the number of particles is configured in this manner, ultrapure water 332 which has been allowed to pass through the filter 328 is suppled into the welded tube 301 to wash the inside of the welded tube 301 and is discharged as a discharge liquid 333. Subsequently, IPA 312 is supplied from the second chemical liquid container 323 into the welded tube 301 to replace ultrapure water with IPA, and then a predetermined amount of IPA is sealed in the welded tube 301.

When a predetermined time has elapsed after sealing IPA, the syringe pump 342 is operated to introduce IPA in the welded tube 301 into the particle counter 341. In the present disclosure, the number of particles is measured in this manner.

Preparation Example 1

A tube having an outer diameter of 9.5 mm, an inner diameter of 6.3 mm, and a length of 20 m, and a tube having an outer diameter of 25.4 mm, an inner diameter of 22.2 mm, and a length of 20 m were prepared by subjecting the copolymer 1 or 2 to extrusion under the molding condition described below. The obtained tubes were cut into 10 cm.

Copolymer 1:
Pellet, MFR=2.0 (g/10 min), melting point=306° C., TFE/PPVE=94.5/5.5 (% by mass), number of functional groups 6 (functional groups/$10^6$ carbon atoms)

Copolymer 2:
Pellet, MER=14.0 (g/10 min), melting point=302° C., TFE/PPVE=94.4/5.6 (% by mass), number of functional groups 4 (functional groups/$10^6$ carbon atoms)

Molding Condition:
Single screw tube extruder, screw diameter=30 mmϕ, L/D=24, die/tip=20/13ϕ, sizing die=10 mmϕ (or 25.4 nm), air gap=8 to 15 mm, setting temperatures, such as cylinder temperatures: C1/C2/C3/C4/H/D1/D2=320 to 330/365 to 368/370 to 372/370 to 372/380 to 382/380 to 382/380 to 382 (° C.)

Comparative Example 1

Two 10-cm tubes (outer diameter 9.5 mm, inner diameter 6.3 mm) containing the copolymer 1 were used. After the edges of the two tubes were made smooth with a dedicated cutting jig, the two tubes were set into a PFA welding machine (model RPWF-1410, manufactured by GNS Ltd.) with a dedicated jig. The edges of the two tubes were heated and melted for about 60 seconds with a heater heated to a setting temperature of 400° C. until the edges of the two tubes were melted and became transparent; the heater was then taken off; the edges of the two tubes were brought into contact with each other until the transparent edges of the two tubes adhered to each other completely; and thus, the two tubes were welded. The pressing distance on that occasion was about 2.1 mm, and the cooling time was about 30 seconds. A welded tube having the connecting structure shown in FIG. 1 was prepared in this manner.

The number of particles eluted from the obtained welded tube was measured by the method described above. Table 3 shows the result.

Example 1

Two 10-cm tubes (outer diameter 9.5 mm, inner diameter 6.3 mm) containing the copolymer 1 were used. Further, a 70 S series joint (shape: union) manufactured by Flowell Corporation was used as a socket weld joint. Each tube described above was intercalated into each side of the socket weld joint. The socket weld joint was heated from the outer periphery thereof using a dedicated automatic welding machine to prepare a welded tube having the connecting structure shown in FIG. 5.

The number of particles eluted from the obtained welded tube was measured by the method described above. Table 3 shows the result.

Comparative Example 2

A welded tube was prepared in the same manner as in Comparative Example 1, except that 10-cm tubes (outer diameter 25.4 mm, inner diameter 22.2 mm) containing the copolymer 1 were used in place of the 10-cm tubes (outer diameter 9.5 mm, inner diameter 6.3 mm) containing the copolymer 1, and the number of particles eluted from the obtained welded tube was measured. Table 3 shows the result.

Example 2

A welded tube was prepared in the same manner as in Example 1, except that 10-cm tubes (outer diameter 25.4 mm, inner diameter 22.2 mm) containing the copolymer 1 were used in place of the 10-cm tubes (outer diameter 9.5 mm, inner diameter 6.3 mm) containing the copolymer 1, and the number of particles eluted from the obtained welded tube was measured. Table 3 shows the result.

Comparative Example 3

A welded tube was prepared in the same manner as in Comparative Example 1, except that 10-cm tubes (outer diameter 9.5 mm, inner diameter 6.3 mm) containing the copolymer 2 were used in place of the 10-cm tubes (outer diameter 9.5 mm, inner diameter 6.3 mm) containing the copolymer 1, and the number of particles eluted from the obtained welded tube was measured. Table 3 shows the result.

Example 3

A welded tube was prepared in the same manner as in Example 1, except that 10-cm tubes (outer diameter 9.5 mm, inner diameter 6.3 mm) containing the copolymer 2 were used in place of the 10-cm tubes (outer diameter 9.5 mm, inner diameter 6.3 mm) containing the copolymer 1, and the number of particles eluted from the obtained welded tube was measured. Table 3 shows the result.

[Table 3]

TABLE 3

| | Co-polymer | Tube size (mm) Outer diameter | Tube size (mm) Inner diameter | Connecting structure | Number of particles eluted (particies/ml) |
|---|---|---|---|---|---|
| Comparative Example 1 | 1 | 9.5 | 6.3 | FIG. 1 | 1930 |
| Example 1 | | | | FIG. 5 | 310 |
| Comparative Example 2 | 1 | 25.4 | 22.2 | FIG. 1 | 4240 |
| Example 2 | | | | FIG. 5 | 960 |
| Comparative Example 3 | 2 | 9.5 | 6.3 | FIG. 1 | 2840 |
| Example 3 | | | | FIG. 5 | 450 |

REFERENCE SIGNS LIST

10, 20, 30, 40, 50 Welded tube
11, 21, 31, 41, 51 Welding structure
12, 22, 32, 53, 54 Welded part
13, 23 Inner surface (liquid contact surface)
14, 24 First tube
15, 25 Second tube
33 Resin tube
42 Heat-resistant tube
52 Joint
301 Welded tube
311, 312 Isopropyl alcohol (IPA)
313, 333 Discharge Liquid
321, 323 Chemical liquid container
322, 328 Filter
324, 325, 326, 327 Valve
331 Nitrogen gas
332 Ultrapure water
341 Particle counter
342 Syringe pump

The invention claimed is:

1. A welded tube comprising a connecting structure formed by welding a first molded body and a second molded body,
   wherein the first and second molded bodies contain a tetrafluoroethylene/fluoro (alkyl vinyl ether) copolymer, wherein the number of functional groups of the copolymer is 50 or less per $10^6$ carbon atoms, and a content of the fluoro (alkyl vinyl ether) unit in the tetrafluoroethylene/fluoro (alkyl vinyl ether) copolymer is 3.3 to 12.0% by mass based on a total amount of monomer units, and
   wherein the first molded body is a tube with an outer diameter of 2 to 100 mm and a wall thickness of 0.1 to 10 mm, and the second molded body is a tube or a joint,
   the connecting structure has a liquid contact surface to be in contact with a liquid having a solubility parameter of 14 to 35 $(MPA)^{1/2}$,
   the liquid contact surface forms an inner surface of the welded tube,
   a welded part formed in the connecting structure is formed by heating from an opposite side of the liquid contact surface, and the welded part is not exposed at the liquid contact surface, and
   the number of particles of 30 nm or larger eluted into an isopropyl alcohol from the liquid contact surface in the connecting structure is 1,000 particles/mL or less when the welded tube is filled with the isopropyl alcohol in an amount equal to the inner volume of the welded tube and left to stand for one day at room temperature,
   wherein the isopropyl alcohol at the time of being filled into the inner volume of the welded tube has a number of particles having a size of 30 nm or larger of 30 particles/ml or less.

2. The welded tube according to claim 1, wherein the copolymer has a melt flow rate of 1 to 60 g/10 min.

3. The welded tube according to claim 1, wherein a melting point of the copolymer is 200 to 322° C.

* * * * *